(12) United States Patent
Atanassov et al.

(10) Patent No.: US 8,798,388 B2
(45) Date of Patent: Aug. 5, 2014

(54) DIGITAL IMAGE COMBINING TO PRODUCE OPTICAL EFFECTS

(75) Inventors: Kalin M. Atanassov, San Diego, CA (US); Hau Hwang, San Diego, CA (US); Hsiang-Tsun Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 869 days.

(21) Appl. No.: 12/630,115

(22) Filed: Dec. 3, 2009

(65) Prior Publication Data

US 2011/0135208 A1 Jun. 9, 2011

(51) Int. Cl.
*G06K 9/40* (2006.01)

(52) U.S. Cl.
USPC .......... 382/260; 382/263; 382/264; 382/294; 382/191

(58) Field of Classification Search
None
See application file for complete search history.

(56) References Cited

U.S. PATENT DOCUMENTS

| | | | | |
|---|---|---|---|---|
| 4,463,375 A | * | 7/1984 | Macovski | 378/98.12 |
| 4,503,461 A | * | 3/1985 | Nishimura | 378/98.12 |
| 4,701,953 A | * | 10/1987 | White | 704/226 |
| 4,827,528 A | * | 5/1989 | Macovski | 382/263 |
| 4,853,963 A | * | 8/1989 | Bloy et al. | 704/225 |
| 4,962,426 A | * | 10/1990 | Naoi et al. | 348/623 |
| 5,384,869 A | * | 1/1995 | Wilkinson et al. | 382/240 |
| 5,602,599 A | * | 2/1997 | Greggain | 348/581 |
| 5,644,513 A | * | 7/1997 | Rudin et al. | 702/190 |
| 5,657,402 A | | 8/1997 | Bender et al. | |
| 5,818,972 A | * | 10/1998 | Girod et al. | 382/260 |
| 5,880,767 A | * | 3/1999 | Liu | 347/251 |
| 5,926,791 A | * | 7/1999 | Ogata et al. | 704/500 |
| 6,018,596 A | * | 1/2000 | Wilkinson | 382/260 |
| 6,122,408 A | * | 9/2000 | Fang et al. | 382/274 |
| 6,201,899 B1 | * | 3/2001 | Bergen | 382/284 |
| 6,285,802 B1 | * | 9/2001 | Dennis et al. | 382/280 |
| 6,320,979 B1 | | 11/2001 | Melen | |
| 6,411,305 B1 | * | 6/2002 | Chui | 345/660 |
| 6,570,673 B2 | * | 5/2003 | Kishimoto | 358/1.2 |
| 6,697,540 B1 | * | 2/2004 | Chen | 382/300 |
| 6,771,320 B2 | * | 8/2004 | Choi | 348/625 |
| 6,823,086 B1 | * | 11/2004 | Dolazza | 382/261 |
| 6,847,738 B1 | * | 1/2005 | Scognamiglio et al. | 382/260 |

(Continued)

FOREIGN PATENT DOCUMENTS

| | | |
|---|---|---|
| JP | H02192276 A | 7/1990 |
| JP | H0410777 A | 1/1992 |

(Continued)

OTHER PUBLICATIONS

Patent Application filed Nov. 12, 2007, in co-pending U.S. Appl. No. 11/938,711.

(Continued)

*Primary Examiner* — Jayesh A Patel (57) ABSTRACT

An apparatus is described. The apparatus includes a digital camera that is capable of shooting at least two images at different effective lens focal lengths. The camera is also capable of high pass filtering (HP) said at least two images, estimating respective spectral densities (SD) of said at least two filtered images and then low pass filtering (LP) the respective estimates of said at least two filtered images prior to combining said at least two images into a single image to produce one or more optical effects.

48 Claims, 8 Drawing Sheets

(56) References Cited

U.S. PATENT DOCUMENTS

| | | | | |
|---|---|---|---|---|
| 7,009,662 B2* | 3/2006 | Ojo et al. | | 348/625 |
| 7,046,854 B2* | 5/2006 | Daniell | | 382/235 |
| 7,076,081 B2* | 7/2006 | Hwang et al. | | 382/100 |
| 7,082,218 B2* | 7/2006 | Pollard et al. | | 382/167 |
| 7,098,954 B2* | 8/2006 | Suda et al. | | 348/347 |
| 7,212,686 B2* | 5/2007 | Someya et | | 382/263 |
| 7,218,448 B1 | 5/2007 | Cathey et al. | | |
| 7,263,241 B2* | 8/2007 | Huang et al. | | 382/263 |
| 7,283,680 B2* | 10/2007 | Cheng | | 382/260 |
| 7,391,933 B2* | 6/2008 | Wang et al. | | 382/300 |
| 7,430,019 B2* | 9/2008 | Kim et al. | | 348/606 |
| 7,519,907 B2* | 4/2009 | Cohen et al. | | 715/723 |
| 7,561,186 B2* | 7/2009 | Poon | | 348/208.99 |
| 7,612,805 B2* | 11/2009 | Solomon | | 348/222.1 |
| 7,668,390 B2* | 2/2010 | Hier | | 382/260 |
| 7,808,558 B2* | 10/2010 | Lin et al. | | 348/631 |
| 8,031,967 B2* | 10/2011 | Zhang et al. | | 382/275 |
| 8,150,197 B2* | 4/2012 | Hwang et al. | | 382/263 |
| 8,189,932 B2* | 5/2012 | Fukuhara | | 382/232 |
| 8,456,541 B2* | 6/2013 | Sambongi | | 348/230.1 |
| 2001/0002216 A1 | 5/2001 | Chuang et al. | | |
| 2003/0012567 A1 | 1/2003 | Itoh | | |
| 2003/0123865 A1 | 7/2003 | Hofer et al. | | |
| 2003/0142877 A1 | 7/2003 | George et al. | | |
| 2003/0210473 A1 | 11/2003 | Ohashi | | |
| 2003/0210829 A1* | 11/2003 | Someya et al. | | 382/263 |
| 2005/0036702 A1 | 2/2005 | Yang et al. | | |
| 2005/0100245 A1 | 5/2005 | Chen et al. | | |
| 2005/0232510 A1* | 10/2005 | Blake et al. | | 382/275 |
| 2006/0051082 A1 | 3/2006 | Tamura | | |
| 2006/0275025 A1 | 12/2006 | Labaziewicz et al. | | |
| 2007/0242940 A1 | 10/2007 | Yumiki et al. | | |
| 2008/0008464 A1 | 1/2008 | Schack et al. | | |
| 2008/0019611 A1* | 1/2008 | Larkin et al. | | 382/287 |
| 2008/0055433 A1* | 3/2008 | Steinberg et al. | | 348/241 |
| 2008/0063294 A1 | 3/2008 | Burt et al. | | |
| 2008/0079839 A1* | 4/2008 | Sung et al. | | 348/345 |
| 2008/0151096 A1 | 6/2008 | Okada | | |
| 2008/0181491 A1* | 7/2008 | Bala et al. | | 382/162 |
| 2008/0239088 A1 | 10/2008 | Yamashita | | |
| 2009/0167928 A1 | 7/2009 | Asukabe et al. | | |
| 2009/0169122 A1 | 7/2009 | He et al. | | |
| 2009/0225199 A1 | 9/2009 | Ferren | | |
| 2009/0226110 A1* | 9/2009 | Chen et al. | | 382/263 |
| 2009/0251561 A1* | 10/2009 | Kuang et al. | | 348/223.1 |
| 2010/0220912 A1* | 9/2010 | Bruder et al. | | 382/131 |
| 2011/0135208 A1* | 6/2011 | Atanassov et al. | | 382/218 |

FOREIGN PATENT DOCUMENTS

| | | |
|---|---|---|
| KR | 100801088 B1 | 2/2008 |
| WO | 0038655 A1 | 7/2000 |
| WO | PCT/GB98/03038 | 11/2009 |

OTHER PUBLICATIONS

Cheung, Karen, "DxO Labs and MagnaChip Develop Depth of Field Chip", downloaded from Internet site digitalcamerainfo.com. Jun. 11, 2009. 3 pages.

International Search Report and Written Opinion—PCT/US2010/058985, International Search Authority—European Patent Office—Feb. 16, 2011.

* cited by examiner

DIGITAL IMAGE COMBINING TO PRODUCE OPTICAL EFFECTS

BACKGROUND

Manufacturers of handheld devices, such as smart phones or personal digital assistants (PDAs), for example, typically, participate in a competitive and demanding consumer marketplace where devices offered are scrutinized by consumers. Consumers appear to desire: ease of use, convenience, relatively low size or relatively low weight, among others.

Consumers may also desire a digital camera having integrated functionality. Examples of integrated identified features include: GPS capability, compass capability, or the ability to connect to the internet wirelessly, among others. These operations or functions may be available, for example, from a mobile station or mobile computing platform. It is reasonable to conclude that quality of features, whether for an integrated digital camera or for a mobile computing platform providing digital camera capability, may therefore be a factor for consumers making a purchase. It is noted here that the term: integrated digital camera refers to a digital camera having integrated other functionality beyond digital photographic capability, such as additional functionality of the type previously described, although these are merely examples of features that may potentially be integrated. For example, an integrated digital camera may integrate other additional features with some of these identified features, one of these identified features or none of these identified features. Likewise, a personal digital assistant, a smart cell phone, a mobile station or a mobile computing platform, for example, may comprise an integrated digital camera. Manufacturers offering such products may face a challenge of overcoming some limiting factors potentially associated with such devices: delivering quality images while maintaining relatively limited physical size, processing power or battery life, for example.

SUMMARY

A variety of embodiments are disclosed herein. Briefly, as an example, in accordance with one embodiment, an apparatus including a digital camera is described. The camera is capable of shooting at least two images at different effective lens focal lengths. The camera is further capable of high pass filtering (HP) the at least two images, estimating the respective spectral densities (SD) of the at least two images and low pass filtering (LP) the respective estimates of the at least two images prior to combining the at least two images into a single image to produce one or more optical effects.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

In the following description of embodiments, reference is made to accompanying drawings which form a part hereof, and in which it is shown, by way of illustration, specific embodiments of claimed subject matter. It is to be understood that other embodiments may include, for example, changes or alterations, such as structural changes, which may be made. All embodiments, changes or alterations, including those described herein, are not intended departures from scope with respect to claimed subject matter.

Some portions of the detailed description included herein may be presented in terms of algorithms or symbolic representations of operations on or applied to binary digital signals stored within a memory of a specific apparatus or special purpose computing device or platform. In the context of this particular specification, the term specific apparatus or the like may include a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification, discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of a special purpose computer or similar special purpose electronic computing device.

The terms "and," "and/or," and "or," as used herein, may include a variety of meanings typically depend at least in part upon the context in which the terms are used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" is intended to refer to a particular feature, structure, or characteristic described in connection with an embodiment included in at least one embodiment of claimed subject matter. However, appearances of the phrase "in one embodiment" or "an embodiment" in various places throughout this specification are not necessarily all referring to the same embodiment. Furthermore, particular features, structures, or characteristics may be combined in one or more embodiments. Embodiments described herein may include systems, machines, devices, engines, or apparatuses that operate using digital signals. Such signals may comprise electronic signals, optical signals, electromagnetic signals, or any form of energy that may be used provides information between two or more separate locations.

Mobile computing platforms include a range of handheld devices including, but not limited, to handheld cell phones, personal digital assistants (PDAs), mobile stations, or mobile station devices. Manufacturers of these devices typically seek a competitive advantage by incorporating diverse functional utility typically intended to capture interest from consumers. Enhancements to these devices may include: global positioning (GPS), music players, internet browsing, digital still or video camera capability, etc.

Providing advanced or improved capability for digital still or video cameras to consumers may at time prove to be a challenge for manufactures of such devices, however. For example, a typical consumer may have vast experience evaluating photographic images due in large part to the maturity of photographic technology generally. Also, the visual nature of photography generally may lend itself to direct comparisons by consumers. In contrast, other forms of functionality or other capabilities being offered in connection with such devices may not so easily be compared by attribute. For example, GPS function may be more difficult for consumers to evaluate due at least in part to its relatively recent introduction as a product offering. Also, a typical consumer may not have a complete technical appreciation for such an offering.

Perhaps due at least in part to its relative maturity as a product offering, de facto standards for image quality or ease of use for digital cameras may exist in the mind of consumers. Meeting or exceeding these de facto standards of consumer expectation continues to drive technological development. However, as alluded to previously, manufacturers may face a challenge of overcoming some limiting factors potentially associated with integrated digital camera product offerings: delivering quality images in the face of relatively limited physical size, processing power or battery life, for example. In summary, there is ongoing competition among manufacturers to satisfy consumer demand for quality images rendered by a handheld device, such as an integrated digital camera, without compromising other features of the device: including size, performance, or battery life, for example. It is likewise noted that even for devices that do not qualify as handheld devices, such as mobile or desktop computing devices, as examples, similar issues are present. Therefore, these devices are also intended to be included within the scope of claimed subject matter.

It may be helpful to quickly review a few high points in the development of photography and related technology. The Brownie camera was introduced in 1900 and represents one embodiment of a point and shoot camera. This device was portable, easy to use, and included a method of media processing that was convenient for consumers at the time. In 1935, Kodachrome® film and processing revolutionized color photography. Vivid true-to-life colors were realized due at least in part to improvements in film processing. In the 1960's, the instant camera (and associated film) introduced an element of immediate results in photography. The later introduction of digital photography may now be view as embodying similar interests as these developments which have historically appealed to photographers, both amateur and professional: convenience, ease of use, instant gratification, satisfactory image quality, etc. However, the digital photography industry is not yet fully mature, has not been fully saturated, and has not fully exploded in terms of demand. Therefore, technical innovation continues to be desirable.

Today, handheld devices, such as smart cell phones or personal digital assistants (PDAs), come with a variety of features that may include, typically, but not necessarily, a digital camera, GPS capability, a compass, the ability to connect to the internet wirelessly, among others, as previously suggested. With respect to a digital camera, such as an integrated digital camera, a challenge confronted by manufacturers is to provide quality images without sacrificing ease of use, convenience, or increased size or weight. One aspect of an embodiment, as described in more detail below, is to employ capabilities of an integrated device to effect digital camera use and perhaps enhance it.

For example, in one embodiment, a digital camera capable of capturing images may also have a capability to capture at least two images at different effective lens focal lengths. Likewise, a digital camera may also have a capability to combine images captured at different effective focal lengths into a single image and, in conjunction with such a combining process, produce various optical effects. Examples of effects that may be produced in this manner, such as those that may be produced by one or more physical lenses, for example, may include providing an extended depth of field (EDOF) effect, providing a wide-angle lens effect, or providing a rotated focal plane effect, although these are merely examples and other effects may also be capable of being produced. In the discussion that follows, processing to produce an EDOF effect is provided merely as an example. Many other types of effects may be created or produced through processing, such as those just mentioned. Likewise, a reduced depth of focus (RDOF) effect may be produced as well as effects that may have no analog with optics for one or more physical lenses as well.

As noted previously, manufacturers of integrated digital cameras are confronted by a set of challenges. Typically, or historically, a transition from film to digital photography has at times produced trade-offs of image quality against convenience or instant results. A device that offers several of these features or advantages therefore continues to be sought.

One aspect of these challenges relates to size of a given device, for example. Fixed sizing of various components, for example, may tend to degrade one's ability to capture a scene in some situations. One specific limitation, for instance, relates to aperture size. For a fixed aperture, for example, this may affect depth of field for an image to be produced. Focal range or depth of field of a lens system refers to a range or distance at which an object appears to be "in focus." Depending at least in part on size, for example, a camera with a fixed aperture may have difficulty rendering a single image containing a number of objects at respectively varying distances within a single frame with those objects being in focus. Depth of field, however, is typically less for large apertures and more for small apertures. It also is noted here that the term 'in focus' is intended as a term of art. For an object in an image or frame to be 'in focus,' does not require that the object be perfectly 'in focus.' Those of ordinary skill understand how much focus tolerance is available with state of the art technology for an object to be considered 'in focus.'

One possible alternative to overcome physical limitations may include utilizing aspects of image processing potentially capable of being performed on a mobile computing platform or similar device. For example, application of various filters or other approaches of altering digital signals, representing an image, for example, may be employed to achieve various optical effects. Of course, again, as suggested previously, available memory, available processing power or available battery life are additional considerations. Nonetheless, one example of such image processing includes application of a process to combine two or more images with different focal depths into a single image to produce an Extended Depth of Field (EDOF) effect for the single image. A process of combining images is described below while referring to FIG. 1. The following, of course, describes one particular embodiment to process and combine at least two images; however, in other embodiments, more than two images may be combined with similar results, for example. Likewise, other embodiments may differ in other respects from the particular embodiment of FIG. 1.

Figure 1:
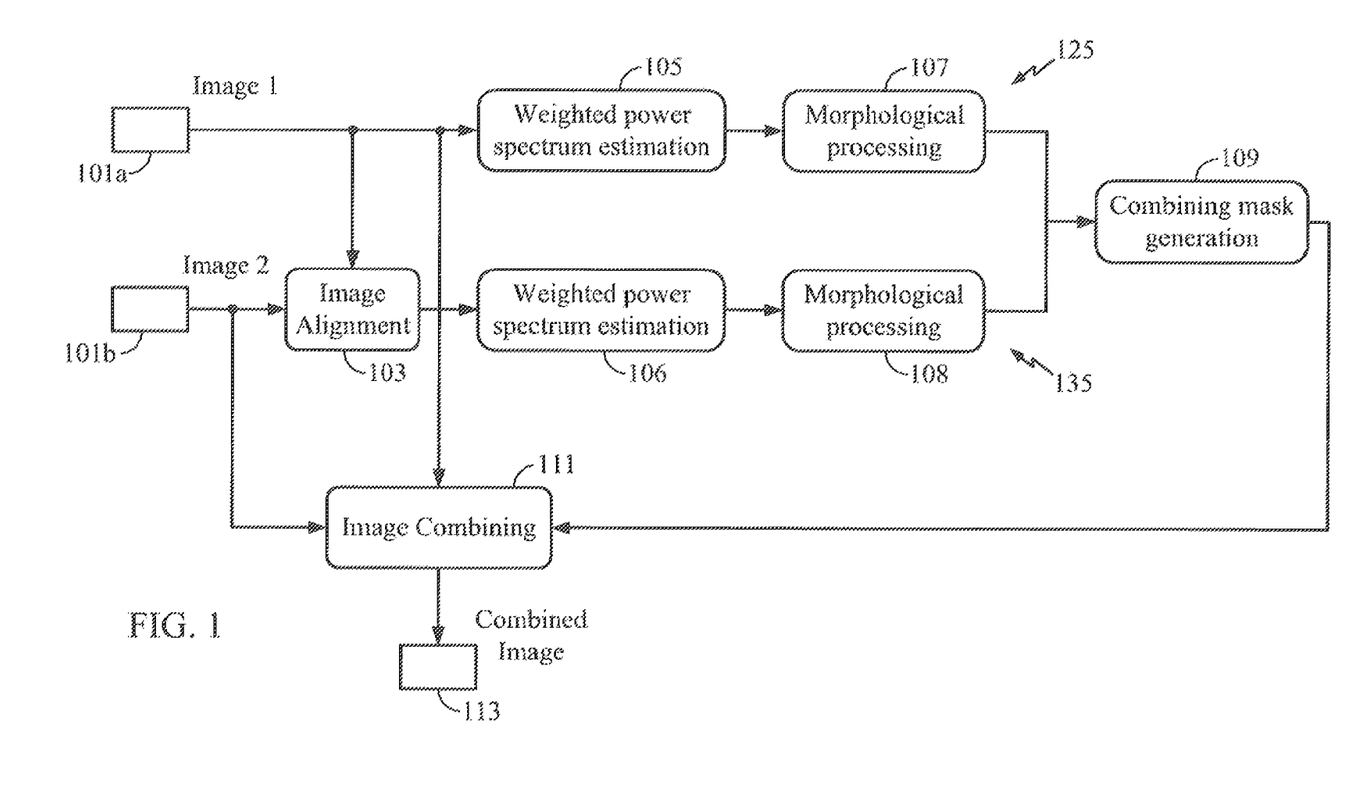
FIG. 1 is a schematic diagram illustrating one embodiment of a process to combine images, such as for an embodiment of an integrated digital camera.

Referring now to FIG. 1, in connection with capturing a scene of interest using a digital device, including digital camera capability, such as an integrated digital camera or a mobile computing platform with digital camera capability, for example, the device may be employed to produce more than one digital image of the scene of interest. In a particular embodiment, as just mentioned, at least two digital images may be involved; however, again, other embodiments may include more than two digital images. For these purposes, assume a particular embodiment is capable of producing separate or different digital images at respectively different focal lengths. As shall be discussed in more detail, this capability commonly exists with state of the art digital cameras, for example.

Therefore, referring again to FIG. 1, two digital images may be produced and retained in memory for processing, referred to in FIG. 1 with reference numerals 101*a* and 101*b*, respectively. After the images are produced, a method of image alignment or frame registration may be applied, further illustrated in FIG. 1 by box 103. Frame registration may be applied to enable later combining of different portions of the two images while reducing potential for misalignment of a scene of interest in a resulting combined image. Various techniques of frame registration or image alignment are possible and claimed subject matter is not limited in scope to a particular approach. However, below, one particular example is provided in more detail for purposes of illustration. After image alignment has been accomplished, separate images are subject to separate processing in one particular embodiment, indicated, for example, by processing paths 125 and 135 in FIG. 1, respectively.

For a particular embodiment, as illustrated by FIG. 1, for example, along paths 125 and 135, images 101*a* and 101*b* are respectively subject to a process that includes estimating power spectral density, collectively described in FIG. 1 as weighted power spectrum estimation, at 105 and 106 respectively. Power spectrum estimation is a well-understood process and will not be described in great detail here. However, for one particular embodiment, a weighted power spectrum estimation process may involve processing beyond conventional power spectral density estimation. In this context, the term weighted power spectrum estimation process refers to combining two or more separately obtained power spectrum estimates to determine an estimate of a power spectrum. The term weighted suggests that the separately obtained estimates may or may not be combined with equal weight to form the ultimate estimate. For one embodiment, an example shall be described in more detail hereinafter, such as in connection with FIG. 8. However, examples are of particular embodiments. Therefore, it is not intended that claimed subject matter be limited to a particular weighted power spectrum estimation process, such as the example of FIG. 8. Many variations of a weighted power spectrum estimation process are possible and all are intended to be included within the scope of claimed subject matter. For example, in one particular embodiment, such as for processing digital images, power spectrum estimation may be performed along two dimensions; however, other embodiments may employ more than two dimensions, for example.

Figure 8:
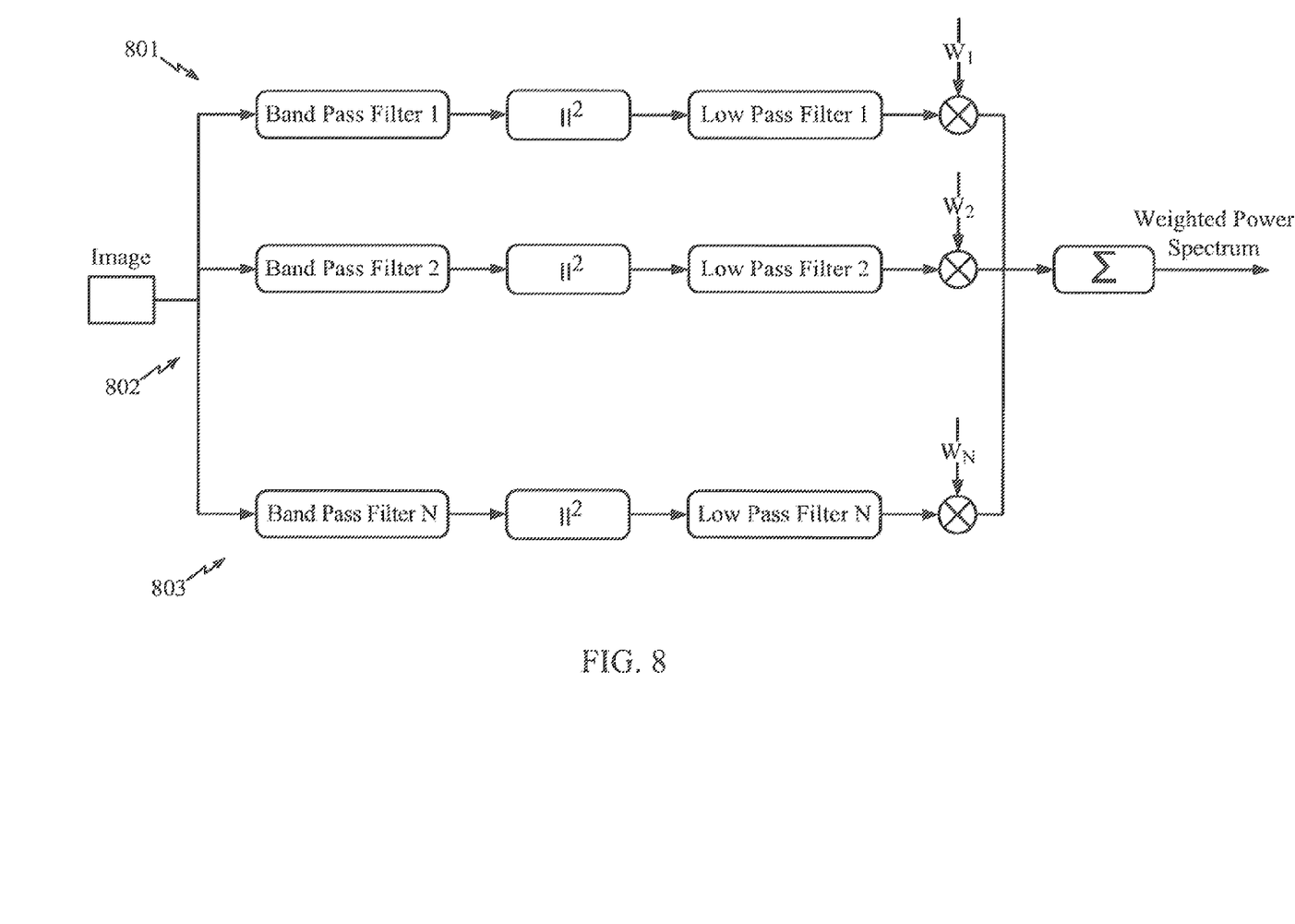
FIG. 8 is a schematic diagram illustrating an embodiment of a portion of the embodiment of FIG. 1 in more detail.

FIG. 8 is a schematic diagram showing aspects of the embodiment of FIG. 1, represented by 105 or 106, for example, in greater detail. A variety of parallel signal processing paths, such as 801, 802 and 803, are illustrated. An embodiment such as this one may have N signal processing paths. A particular signal processing path produces a separate estimate of the power spectrum of interest. The estimates are weighted by $w_i$, where in this example i comprises positive integers ranging from 1 up to N. These values may be viewed as estimates of power in a band of interest, for example. Thus, in this example, along a path, to obtain an estimate to be used for weighing, a digital image is filtered to remove or reduce lower frequency content typically, from this filtered digital image an estimate of power spectral density is obtained, and the estimate is filtered again to remove or reduce higher frequency content. It is noted that for various embodiments, separate signal paths may involve different filters or perhaps different portions of a digital image, if desired. This particular filtering structure is also described in some detail in connection with a discussion of the embodiment of FIG. 5, below.

A weighted power spectrum estimation process, as just described, may render images in a condition for morphological processing, as illustrated by 107 and 108 in FIG. 1 respectively, in a particular embodiment. As was discussed for weighted power spectrum estimation, it is not intended that claimed subject matter be limited to a particular morphological process, such as an example described below. Again, many variations are possible and it is intended that all variations be included within the scope of claimed subject matter. After application of morphological processing, a comparison between images results in generation of a combining mask, as demonstrated in FIG. 1 by 109. After a combining mask has been generated from a comparison of images 101*a* and 101*b* for a particular embodiment, a generated combining mask may be applied to combine original or initial images, as shown by 111 in FIG. 1

Image combining for a particular embodiment may result in rendering of a combined image, as demonstrated by 113 in FIG. 1. Of course, the foregoing is intended to provide one example embodiment of an image combining process so that one potential work flow for such processing has been illustrated. Below, a detailed description of another possible embodiment is provided, also for purposes of illustration. Of course, these embodiments are intended to be illustrative rather than limiting. Therefore, it is not intended that claimed subject matter be limited to any of particular embodiments described herein. Many variations from these examples are possible and such variations are intended to be included within the scope of claimed subject matter.

Figure 3:
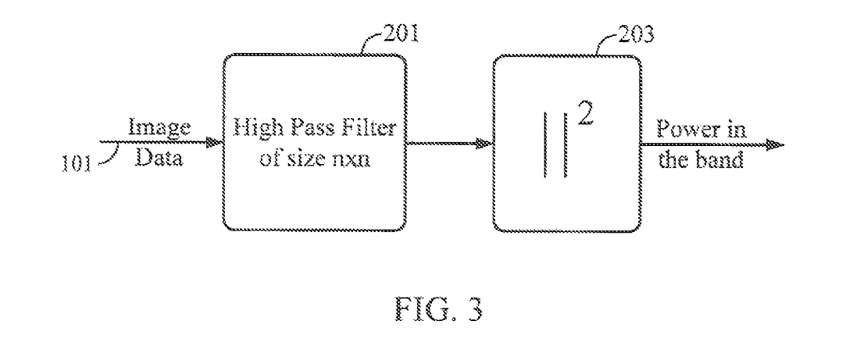
FIG. 3 is a schematic diagram illustrating one embodiment of a process to filter images, such as for an embodiment of an integrated digital camera.

FIG. 3 illustrates application of a high pass digital filter 201 to a digital signal 101. In this embodiment, signal 101 comprises a variety of signal values, such as pixel signal values, representing a digital image. As illustrated, following digital filter 201, a spectral density estimation process, designated as 203, is shown. However, the approach illustrated by FIG. 3 possesses disadvantages, as shall become clear from the description below. In particular, unlike the approach described with reference to FIG. 1, for example, separate spectral density estimates are not combined. This aspect of FIG. 3 is described in more detail below.

Figure 2:
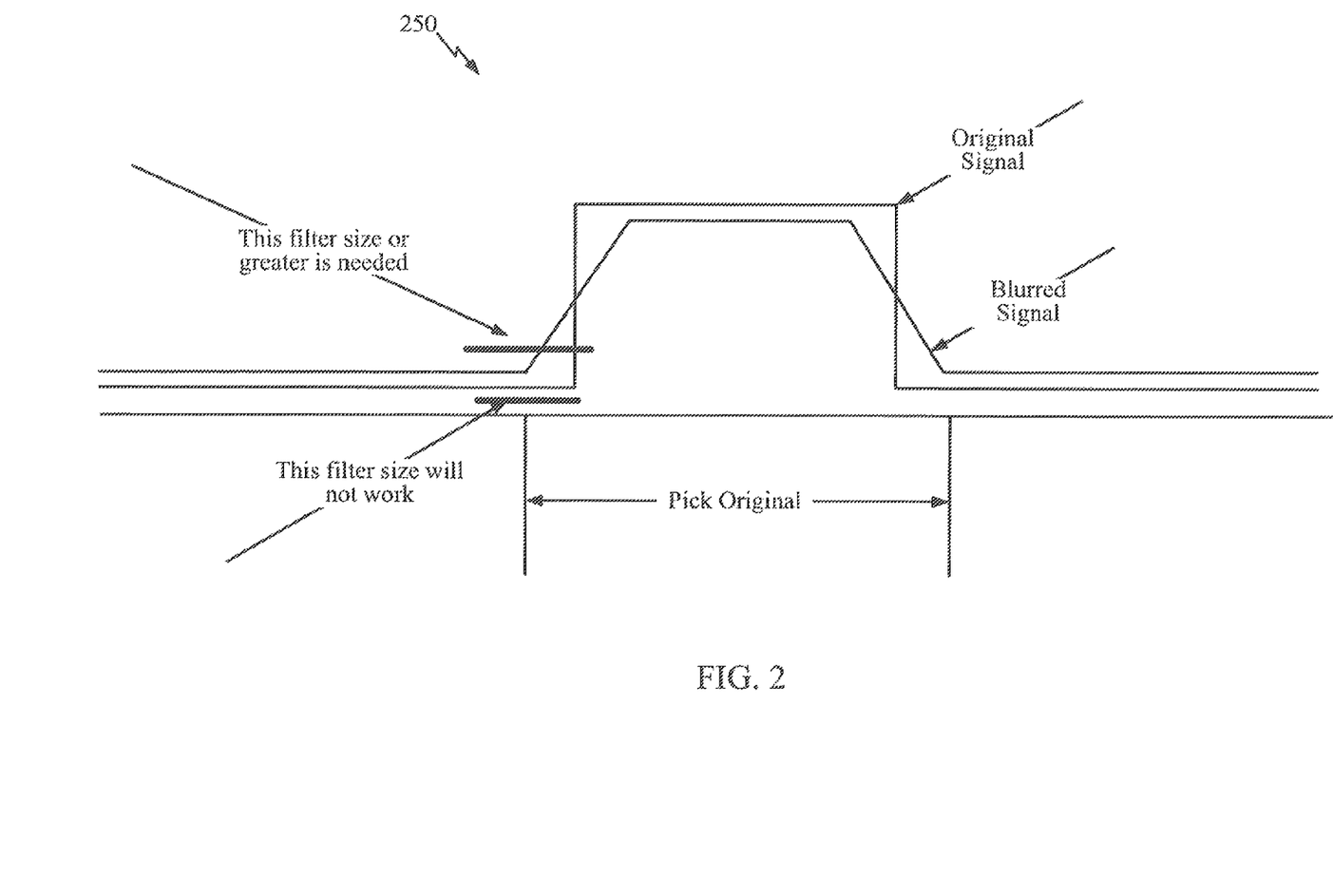
FIG. 2 is a schematic diagram illustrating one embodiment of a digital filter having a size much greater than a lens blur kernel, such as for an embodiment of an integrate digital camera.

However, another potential technical issue for image processing relates to digital filter length. This aspect is illustrated by FIG. 2. FIG. 2 illustrates that if a digital filter is employed to process a digital image, for example, filter size should be greater than a lens blur kernel for the lens or lenses employed to produce the digital image. If a digital filter size is employed that is too short, digital filter processing to produce a final image, for example, may, in effect, produce artifacts, such as false edges or halos. FIG. 2, for example, illustrates a digital filter of insufficient length in a vertical direction in the drawing may unnecessarily blur an initial or original signal. However, if a filter size is employed that is greater than a lens blur kernel, significant degradation in resolution or sharpness should not result from digital filter processing of the particular digital image. In this context, the term lens blur kernel refers to the length of a kernel filter that produces image blurring equivalent to the particular lens.

Figure 4:
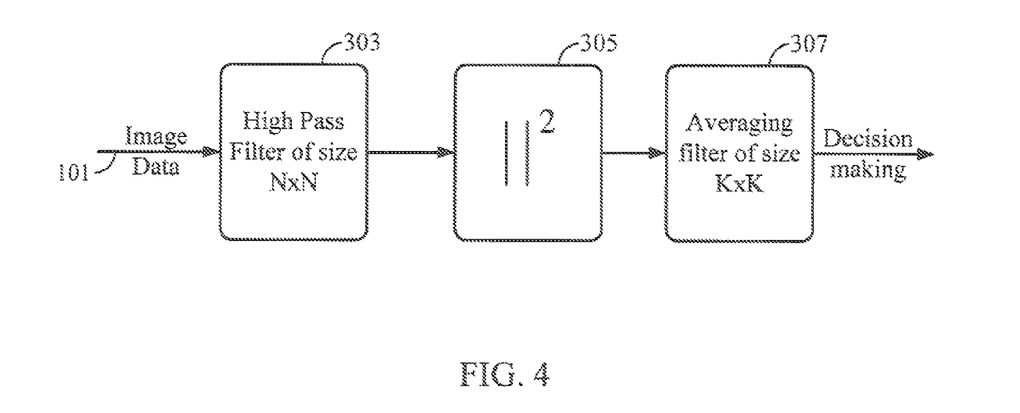
FIG. 4 is a schematic diagram illustrating another embodiment of a process to filter images, such as for an embodiment of an integrated digital camera.

FIG. 4 illustrates an embodiment that may be applied to address at least in part technical issues illustrated by FIGS. 2 and 3. More particularly, the embodiment of FIG. 4 employs a high pass filter 303 and a low pass or averaging filter 307 in addition to performing spectral density estimation, depicted in FIG. 4 by 305. A combination of filters 303 and 307 in this particular embodiment produces an effective filter length of N+K in both dimensions for a two dimensional filter, as illustrated by FIG. 4. If N+K is greater than a lens blur kernel for a particular lens used to produce a digital image, as indicated previously, filter length should be sufficient. Of course, depending, for example, on a variety of factors including the particular lens, a blur kernel may be on the order of tens of pixels. Therefore, technical issues related to memory size, processing power or battery life may present additional complexities for an integrated digital camera or other handheld device, such as a mobile computing platform, for example, as described in more detail below.

However, another challenging issue alluded to previously with the embodiment of FIG. 3 relates to noise robustness in produced output signals. Instinctively, one may guess that an approach to address improving noise robustness for a particular output signal may be to employ a digital filter of greater size; however, unfortunately, it may be demonstrated that such an approach typically will not improve noise robustness of a resulting signal. Instead, however, such an issue may be handled in an embodiment, for example, by employing a process involving weighted power spectrum density estimation, such as discussed, for example, in connection with the embodiment of FIGS. 1 and 8. The embodiment of FIG. 4, for example, may be applied to implement such an approach, if desired, although, of course, this approach is merely provided for purposes of illustration. Claimed subject matter is not intended to be limited to the approach demonstrated by FIG. 4.

A result from power spectral density (PSD) estimation theory is that increasing filter size may improve resolution, but generally does not improve noise robustness. For digital images, as may be processed, for example, by the embodiments discussed previously, typically two dimensional filters are employed. Nonetheless, the underlying principle estimation principle may be illustrated using a one dimensional periodogram spectral density estimator. Below, for example, a Z-transform for a digital filter of length N, N being a positive integer, may be employed to which a phasor or periodogram at omega ($\omega$) is applied. Likewise, using the relationships below, it is possible to compute a periodogram at an omega ($\omega$) of zero, which represents a typical input signal comprising a DC or essentially non-varying signal value level.

Assume an input signal to a digital filter comprises a constant amplitude of A plus a term for noise, designated here as n(i). Assume statistics for n(i) are Gaussian with zero mean. The relationships below demonstrate irrespective of digital filter length, noise robustness of an output signal from any digital filter, having coefficients s(i), for example, will not improve with increasing length of the particular filter and noise robustness shall be related to the variance of n(i).

$$\frac{1}{N}\left(\sum_{i=0}^{N-1} s(i)e^{\frac{-j\omega i}{N}}\right)^2 \rightarrow \text{periodogram at } \omega$$

$$\frac{1}{N}\left(\sum_{i=0}^{N-1} s(i)\right)^2 \rightarrow \text{periodogram at } 0$$

$$\frac{1}{N}\left(\sum_{i=0}^{N-1} A + n(i)\right)^2 = A^2 + \frac{2A^2}{N}\left(\sum_{i=0}^{N-1} n(i)\right)^2 = A^2 + 2A^2\left(\frac{n_{sum}}{\sqrt{N}}\right)^2$$

The variance of $\frac{n_{sum}}{\sqrt{N}}$ is the same as $n(i)$

However, returning to the embodiment of FIG. 4, it provides an approach that may be applied to improve noise robustness of an output signal despite the analytical results shown immediately above. Consider a digital filter with length of N equal to 20. If we double filter length to 40, a digital filter of length 40 should provide better resolution than a digital filter of length 20. However, as discussed above, noise robustness for output signals from respective filters should be about or substantially the same. However, consider that, if instead of increasing N to 40, one were to compute two periodograms of length 20 and average the estimates. From a memory utilization standpoint, these approaches employ essentially the same number of locations for digital signal processing, that is, 40. The latter approach, however, is similar to applying a weighted power spectrum estimation process, as previously described, except that in this example equal weights are in effect applied to the estimates. In such a proposed structure, noise robustness is improved; however, resolution is not improved in comparison with a digital filter of length 20. Therefore, a complete tradeoff has in effect been made between resolution and noise robustness. A different trade off may, however, be desirable depending on a variety of parameters, such as related to the particular application at hand. This could be implemented, for example, through employing a weighting other than equal weights, for example. This is illustrated, for example, by the embodiment shown in FIG. 8.

Therefore, the embodiment of FIG. 4 may be employed for image processing to generate a digital image with improved noise robustness, as desired. This approach may be implemented, such as by the embodiment of FIG. 5, discussed below, to combine images. It is noted here that the foregoing method embodiment may be applied using a variety of specialized programmed computing platforms, such as a DSP, microcontroller or microprocessor, to provide a few examples. Furthermore, while in our example, spectral density estimation was performed by construction using non-overlapping digital signal sample values, in other embodiments, assuming there is some overlap of digital signal samples, still improved noise robustness should result. Therefore, claimed subject matter is not limited in scope to completely non-overlapping power spectral density estimates.

Figure 5:
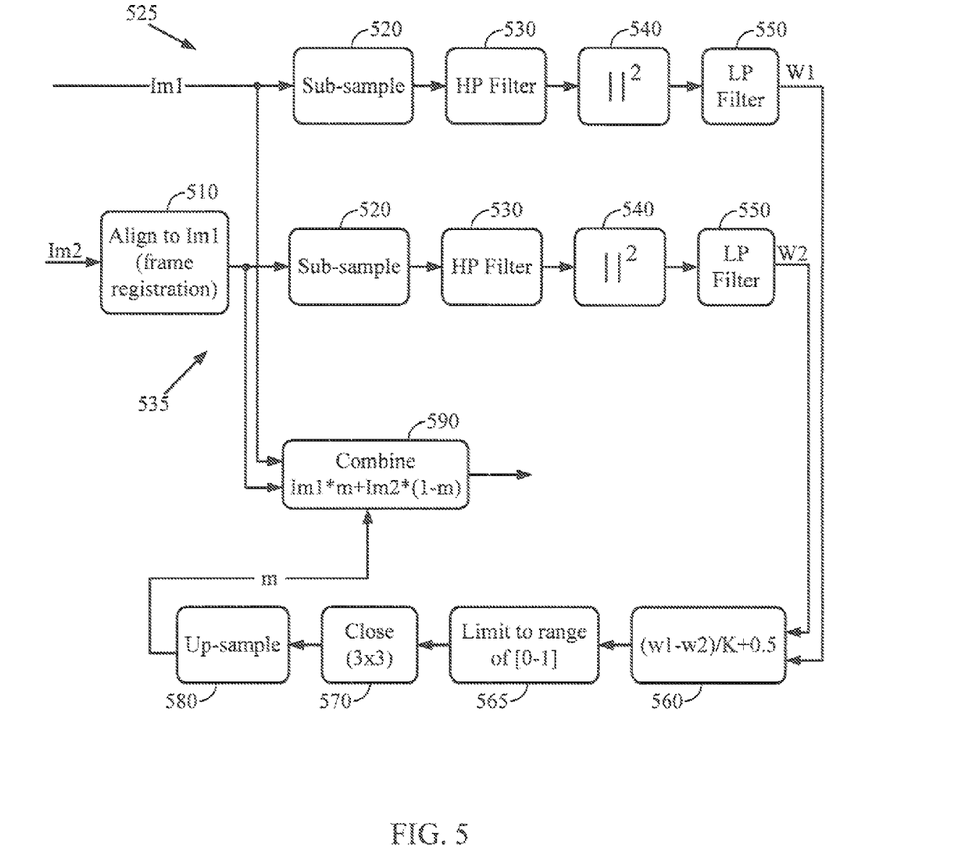
FIG. 5 is a schematic diagram illustrating another embodiment of a process to combine images, such as for an embodiment of an integrated digital camera.

Referring to FIG. 5, another embodiment of a process of combining images, such as for an integrated digital camera is illustrated. Again, however, this embodiment is merely provided for illustrative purposes. It is not intended that claimed subject matter be limited to this particular embodiment. Like the embodiment of FIG. 1, at least two images are employed; in other embodiments, however, multiple images may be employed in a similar manner. It is noted, of course, that as with the embodiment of FIG. 1, similarly, an image or frame registration is performed, indicated in FIG. 5 by 510.

Any one of a number of approaches to frame registration may be employed. Claimed subject matter is not limited to a particular type or approach for frame registration. Generally frame registration is well known in photography and involves a process wherein separately captured images are aligned based at least upon a common element or elements which may be referenced between images. In the present case where a number of digital images are captured, processed, and combined to create a single image, frame registration or alignment between images may typically be desirable. Without proper frame registration between images, subsequent processing or combining of images may result in image quality degradation. One method of frame registration or image alignment employed in digital photography is described in Atanassov et al. (hereinafter, Atanassov), U.S. patent application Ser. No. 11/938,711, filed on Nov. 12, 2007, titled "Block-based Image Stabilization" assigned to the assignee of currently claimed subject matter, herein incorporated by reference in its entirety by reference. Other methods of frame registration, of course, are capable of being employed and it is not intended here to limit the scope of claimed subject matter to any particular approach. Atanassov merely describes one method of frame registration or digital image alignment as an illustrative example.

The approach described in the aforementioned patent application may employ pixels or block of pixels common to a number of images, such as at least two images. These pixels or blocks of pixels may be identified as reference points for combining images. Additionally, it should be noted, that a process of frame registration or block adaptive registration may prove useful in producing a number of other effects, where common pixels or blocks of pixels may be identified between images. For example, a close up image may be captured with a reference object such as, for example, the point of a hat on a Garden Gnome. A first image may comprise a close-up of a Gnome's Hat with a background of a garden. A number of subsequent images from similar or dissimilar points of view may be captured that may include a reference point of the Gnome's Hat where those images have a different focal objective. By this method, it may be possible to produce a number of optical effects some of which may not yet be known to photography or are otherwise unconventional. Examples of possible effects provided for purposes of illustration and without intending to limit application of claimed subject matter may include: a fisheye lens, a panorama, or warped reality.

In another embodiment, it may be desirable to include an interactive function or operation where a user may have an ability to identify one or more specific reference points within several images that may be intended to be combined in some fashion. In yet another embodiment, it may be desirable to include a menu of effects that may be applied to a group of images identified or selected for combining. In still another embodiment, it may be desirable to have an interactive tutorial that describes to a user how to effectively capture a number of images including perspectives or points of view, distances, focal lengths etc. to achieve a specific optical effect. These various image effects may be implemented on any number or variety of specialized computing platforms that may be utilized for image processing, such as a mobile computing platform, a desktop computing platform, etc. Such computing platforms may or may not include a digital camera capability; a computing platform may process received digital images that may have been created elsewhere, for example.

Referring again to FIG. 5, after image registration, images to be processed may be down or sub-sampled as a form of conditioning prior to later processing. As previously discussed in connection with FIG. 2, it may be desirable to apply digital filtering with a filter length that exceeds a lens blur kernel. However, as discussed previously, this may comprise tens of pixels or more. Typically, a larger filter size, such as on the order of tens of pixels, may in some situations imply use of a sizable amount memory, processing power and energy, such as an amount typically, but not necessarily, exceeding capability of a handheld or mobile computing device or platform, as an example. Nonetheless, by down or sub-sampling prior to processing, such as illustrated in FIG. by 520 for paths 525 and 535, respectively, these issues may be addressed without significant loss of quality in terms of a resulting image.

Figure 9:
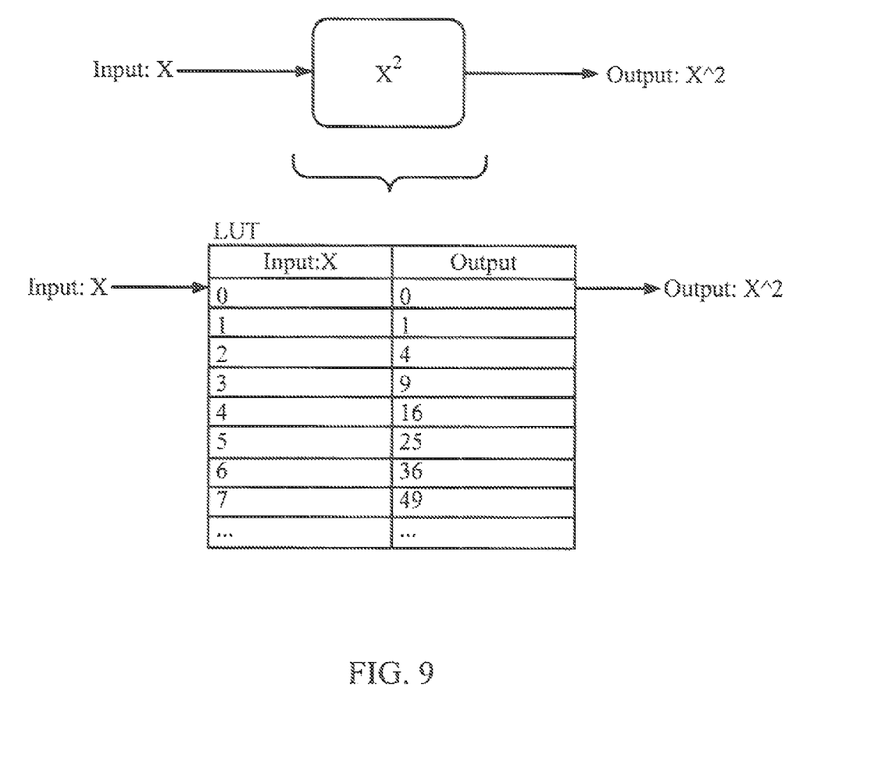
FIG. 9 is a schematic diagram illustrating an embodiment of a portion of the embodiment of FIG. 5 in more detail.

One approach, similar to the embodiment of FIG. 4, for example, after down sampling, may involve applying high pass filtering, spectral density estimation, followed by a low pass filter to effectively weigh separate spectral density estimates. Previously, an averaging was discussed; however, a low pass filter may also be employed to apply a more complex weighing, suitable for the particular application, than averaging, such as illustrated by the embodiment of FIG. 8; however, an averaging embodiment is, of course, likewise not intended to be excluded. For the embodiment of FIG. 5, two images, for example, may be processed in a similar fashion, as illustrated by paths 525 and 535, respectively. Referring now to FIG. 5, images may be sub-sampled or down-sampled to produce a sub-sampled or down-sampled image at 520. Sub-sampled or down-sampled images may then be high-pass filtered at 530. After high-pass filtering, respective power spectral densities may be estimated, for example, such as at 540. Power spectral density estimation is well-known and will not be described in detail here. After respective power spectral densities have been estimated, results may be low-pass filtered at 550. In an embodiment in which estimation of a power spectrum is involved, such as estimation of a weighted power spectrum, typically a squaring operation is implemented. This is illustrated in various figures, such as FIG. 4 by 305, FIG. 5 by 540 or in FIG. 8, as examples. Claimed subject matter is not limited in scope to a particular implementation of this operation. Various embodiments may employ various approaches. For example, in one embodiment, a register value may be copied to another register and both may be provide as operands to an arithmetic unit. Likewise, FIG. 9 illustrates another possible embodiment. The embodiment of FIG. 9 illustrates a table look-up implementation. It is not intended that claimed subject matter be limited in scope to any particular implementation. Rather, it is intended that any and all possible implementations be included with claimed subject matter.

The process above may be applied to pixels within the digital images so that, for a given pixel location, there are two values: one produced for Image 1, e.g., path 525, and one produced for Image 2, e.g., path 535, as illustrated in FIG. 5. At this point, for a given pixel location, the values may be compared; such as at 560. In one particular embodiment, for example, a higher pixel value may indicate, for a particular pixel location, that the image which produced the higher value should supply the pixel value for that location in a combined image. The higher value suggests that the image which produced it has more high frequency content at the particular pixel location. Therefore, the image having higher frequency content at that location may be used to provide the pixel value for that location. This comparison may be done across image pixel locations using respective pixel values at corresponding locations in separate images in a particular embodiment. Alternatively, however, as another embodiment, a grey scale value may be employed, as illustrated, for example, by blocks 560 and 565 in which a value between 0 and 1 inclusive may be employed. Likewise, for a particular pixel location of a combined image, the value in the particular location may comprise a weighted value obtained from the two separate images in corresponding locations for those images, for example.

In an embodiment employing a binary mask, however, a selection of a particular image pixel value for a particular pixel location may be accomplished in one embodiment using the binary values '1' and '0' Thus, a '1' may indicate selection of a pixel value from one of the two images, at that pixel location, while a '0' may indicate selection of a pixel value from the other of the two images, at that location. Alternatively, however, as illustrated in FIG. 5 by blocks 560 and 565, a grey scale value may be produced for the location where the value is limited to be within the range of 0 and 1 inclusive.

After values are assigned across pixel locations for a combined image, a morphological process or close mask may be applied, as indicated by 570. Although this is merely an illustrative example, here a 3×3 block may be applied. An image array of values may be scanned in block sizes of 3×3, as an example. In an initial pass, a ceiling process may be applied. After that is done, a floor process may be applied in a similar fashion. For example, for a ceiling process, if most of the pixels within the 3×3 block are '1,' then all of the pixels may be assigned '1.' Likewise, for a floor process, if most of the pixels within the 3×3 block are '0,' then all of the pixels may be assigned '0.' A variety of ceiling or floor morphological processes are possible and it is not intended that claimed subject matter be limited to any particular morphological process; however, below, details of an example process are provided for purposes of illustration. Again, it is intended that other morphological processes other than this specific example are also within the scope of claimed subject matter.

While morphological processing may comprise a number of alternative parameters and particular operations may be affected by any number of conditions or variables. The following example of a method of morphological processing is provided simply to illustrate a method without limiting application to a particular implementation. It is noted, however, that morphological processing may be applied to binary images or to grey scale images as simply two examples without limitation. For example, in embodiments described previously, w1 and w2 comprise grey scale masks, although claimed subject matter is not limited in scope in this respect, of course.

Figure 7:
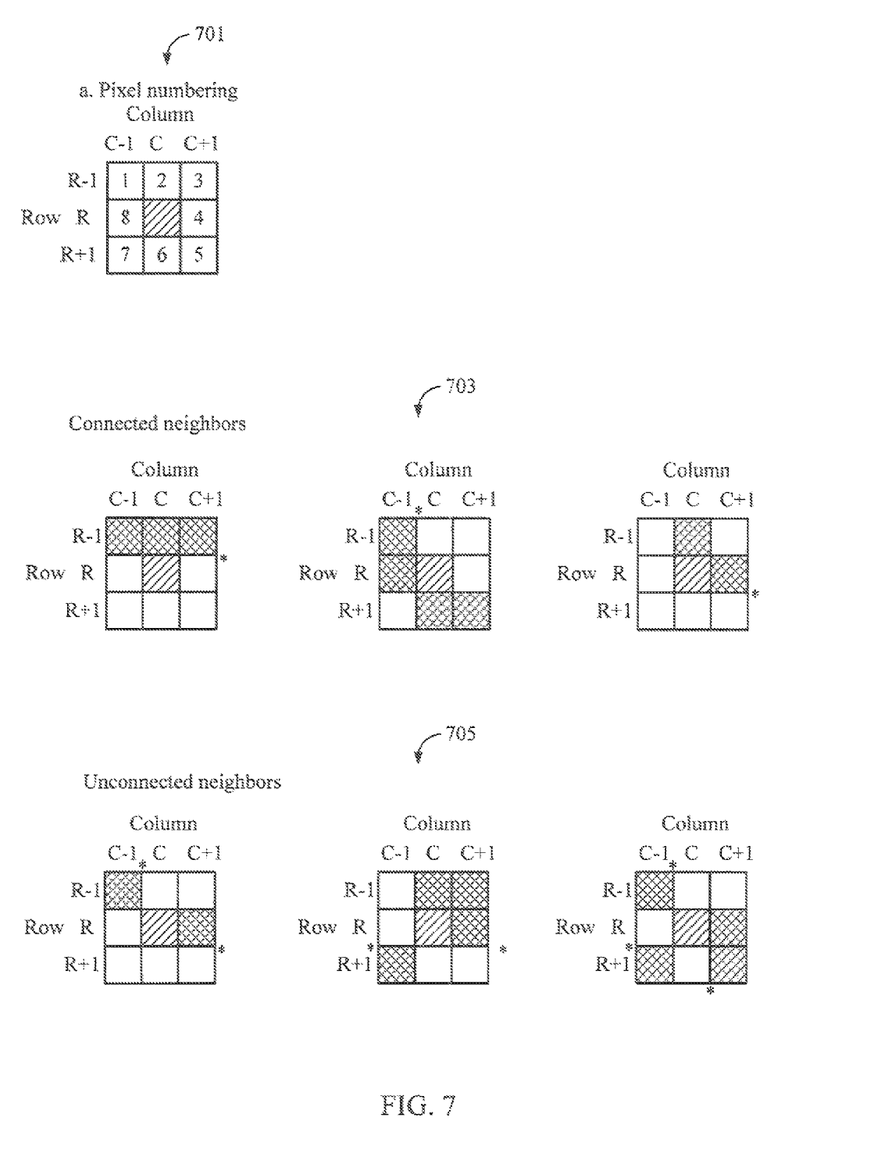
FIG. 7 is a schematic diagram illustrating one embodiment of a morphological process, such as for an embodiment of an integrated digital camera.

In a particular embodiment, a decision to remove a pixel may be based on four rules. A pixel may be changed from 1 to 0 if these rules are met. As shown in FIG. 7, by 701, a pixel at location [R,C] has eight neighbors. The four neighbors in the horizontal and vertical directions (labeled 2,4,6,8) may be referred to as close neighbors. Diagonal pixels (labeled 1,3, 5,7) may be referred to as distant neighbors. For one particular embodiment, four rules as follows may be applied:

Rule one: The pixel under consideration is presently 1. If the pixel not 1, do nothing and move to another pixel because a rule is not met.

Rule two: At least one of the pixel's close neighbors is 0. In other words, if a pixel is 1, and it is completely surrounded by non-zero pixels, it is to be left alone on this iteration. Move to another pixel because a rule is not met.

Rule three: The pixel has more than one neighbor that is a 1. If it has only one, move to another pixel because a rule is not met.

Rule four: A pixel cannot be changed if it results in its neighbors being disconnected. As shown by examples 703 in FIG. 7, connected in this context refers to all pixel neighbors that are a 1 touch each other. Likewise, examples 705 show that unconnected refers to the pixel neighbors that are 1 forming two or more groups.

A similar approach may be applied where in the rules above pixels of value 0 rather than value 1 are considered. This may be referred to as a floor process rather than a ceiling process. Of course, again, the foregoing describes one particular embodiment and claimed subject matter is not limited in scope to this particular embodiment.

In one embodiment, a process of closing may be used to favor foreground over background in a combining mask by applying a ceiling process followed by a floor process. However, in a particular embodiment, as indicated previously, likewise, two morphological processes may be applied successively in a different order, for example. After morphological processing, in a particular embodiment, a closed combining mask may be up sampled for use in combining initial or original images into a single image where pixel values are selected for particular pixel locations in a combined image by selecting between two images. This is illustrated in FIG. 5 by 570, 580, and 590 for example.

In another embodiment, a digital camera may include the ability to adjust the focal length of one or more lenses so that a particular object within a field of view, for example, may be 'in focus' in a particular frame or image. This may be accomplished using any one of a number of approaches and claimed subject matter is not limited in scope to a particular approach. A number of auto-focus processes are known and, therefore, shall not be described in detail. However, as one example, for a particular image or preview, a histogram of contrast signal values may be produced using a process in which a lens focal length for a digital camera is smoothly adjusted from having close objects 'in focus' to having far objects 'in focus,' for example. Although claimed subject matter is not limited in scope in this respect, this approach is one common technique for a digital camera to effectively 'auto-focus.' Higher peaks on a histogram of contrast signal values, for example, may indicate sharp edges of an object that is 'in focus.' Furthermore, by using state-of-the-art MEMS actuator technology, a camera having a lens, or having a system of lenses, may reasonably quickly adjust focal length. As an example, an auto-focus camera module, the Siimpel Focus 20X module, is currently available from Siimpel Corporation, located at 400 East Live Oak Avenue. Arcadia, Calif. 91006. Likewise, an integrated digital camera may include the ability to adjust one or more lenses so that different objects in a camera's field of view are 'in focus' for different frames. Of course, other technologies are also available to provide this focal adjustment capability other than MEMS technology. It is not therefore intended that claimed subject matter be limited in scope to MEMS technology.

In an embodiment, the capability to adjust focal length relatively quickly may be useful, for example, in a situation in which a scene within a field of view includes two objects at different distances from a lens or system of lenses for a digital camera. For example, a first image may be captured at a first focal length corresponding to the closest object being 'in focus.' Likewise, a second image may be captured of a similar scene, but in this case, focal length may be modified or adjusted so that, instead, an object that is furthest is 'in focus.' These two images may then be processed and combined, for example, by using one of the previously described embodiments. Of course, it is not necessary that nearest and farthest objects be employed. In other embodiments, focal objects may be selected within a field of view other than nearest and farthest objects.

Two objects are discussed above simply for the purposes of illustration. In another embodiment, a digital camera may perform a similar operation for multiple objects rather than just two. This may be accomplished a variety of ways and claimed subject matter is not limited in scope to a particular approach. For example, in one approach, objects may be combined two at a time, whereas in another embodiment all objects may be combined at one time, assuming that capability is available, to create a single image using variations of some of the embodiments previously described.

Alternatively, consider an embodiment in which an integrated digital camera has a capability to focus on two objects at different distances in its field of view using two successive frames or images; however, suppose the particular embodiment is limited to two successive frames, so that if there are multiple objects in a field of view, not all objects may necessarily be 'in focus' in a combined frame or image. A number of different processes are possible in such a situation and it is not intended to limit claimed subject matter to any particular approach.

It is not feasible to describe here all possible processes that might be used; therefore, solely for illustration, an example process is described. For example, if there are more than two objects of interest, an embodiment may be employed to adjust focal length so that focusing takes place on a nearest object for a first frame and focusing takes place on a furthest object for a second frame. Using an embodiment, such as one of those previously described, for example, to combine digital frames or images, objects between those furthest and nearest may appear to be 'in focus' or relatively close to 'in focus' as a result of an extended depth of field effect, depending for example, on proximity to such nearest and furthest objects, for example. Of course, the particular scene should also have some influence. Therefore, other objects besides nearest and farthest might be out of focus in some situations. In an alternate process, which is a modification of the process just discussed, assume nearest or furthest objects in a field of view do not necessarily generate top peaks in a histogram of contrast signal values, for example. If nearest and furthest objects produce lower peaks than other objects, then the previous process may be modified so that, instead, those objects providing highest peaks and sharpest edges are objects upon which focus occurs for purposes of capturing successive digital frames or images that are to be combined to produce an EDOF effect. In another embodiment, however, it may instead or in addition be desirable to provide an interactive component wherein a digital camera is capable of selecting objects within a scene of interest based at least in part on user selected choices for one or more multiple images. This interactive component might, for example, employ an image stored temporarily specifically for user interaction.

In still another embodiment, a digital video camera capable of producing video frames having an extended depth of field effect (EDOF) may be desirable. In an embodiment, for example, one or more frames of digital video may include at least two objects of interest at different distances from one or more lenses of the digital video camera. Both objects may be made to appear 'in focus' for digital video from such an embodiment. Of course, in some embodiments, more than two objects at different distances may appear 'in focus.'

As described in more detail below, a digital video camera embodiment may be capable of capturing video in which successive frames are shot at different effective lens focal lengths and, likewise, may be capable of combining the captured successive video frames to produce an extended depth of field effect in a combined video frame. As discussed above, an embodiment of a digital video camera may be capable of shooting successive frames at different effective lens focal lengths sufficiently quickly by using a micro-electro-mechanical system (MEMS) actuator. Thus, focal length for a lens or a system of lenses may be changed more quickly than one-sixtieth of a second. An embodiment, for example, two objects of interest at different distances may be 'in focus' in one or more successive frames in a digital video; however, the frames of the digital video, for a particular embodiment, comprise combined digital images, such as previously described, for example.

Two objects are employed simply for the purposes of illustration. In other embodiments, for example, a similar operation may be employed for multiple objects, rather than merely two objects. Nonetheless, continuing with this example, in a situation involving two objects, consider a digital video camera in which, for successive frames or images, the camera may include the ability to adjust its lens focal length so that, as the camera captures images of two objects within its field of view, alternate, successive captured frames have the two respective objects 'in focus' alternately. In other words, in a first frame or image, for example, a first object may be 'in focus' and a second object may be out of focus. In a next successive frame or image, however, by adjusting lens focal length, now the first object may be out of focus and the second object may be 'in focus.' For a third successive frame, the first object, which may have moved if it is an object in motion, for example, may again be 'in focus' while the second object may be out of focus. Likewise, for a fourth successive frame, the second object, which may also have moved if in motion, may be 'in focus' and the first object may be out of focus.

Producing a sequence of successively captured frames or images in the manner just described may permit a digital video camera to take captured successive frames. Furthermore, a mobile or handheld computing platform may employ embodiments, such as examples previously described, to combine alternating captured frames with its immediately succeeding frame, for example, to produce a combined frame, as described above, in which both objects within the field of view are 'in focus' despite being at different distances from the camera lens or system of lenses. For example, the first and second frame may be combined so that both the first object and the second object are 'in focus' in an initial or first combined frame. Likewise, the third and fourth framed may be combined so that the first and second object are 'in focus' in a next or second combined frame. By repeating this process, a sequence of successive frames may be produced in which frames in the sequence demonstrate an EDOF effect. Successive frames therefore as just discussed, in an embodiment, therefore, comprise a digital video with an EDOF effect.

Figure 6:
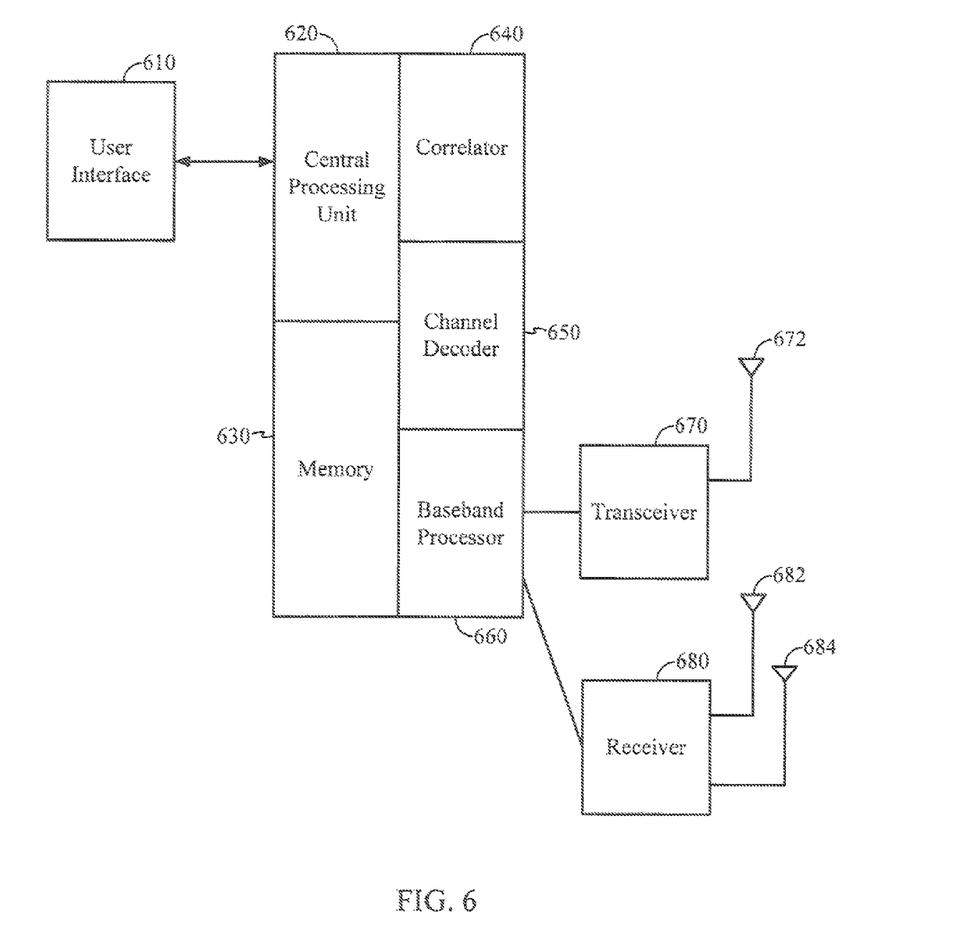
FIG. 6 is a schematic diagram illustrating one embodiment of a mobile computing platform or device, such as one that may include an embodiment of an integrated digital camera.

FIG. 6 is a block diagram of an example of mobile computing platform or station 600 that may be adapted to perform any of the example techniques described herein in connection with FIGS. 1-5, 7-9. One or more radio transceivers 670 may be adapted to modulate an RF carrier signal with baseband information, such as voice or data, onto an RF carrier, and demodulate a modulated RF carrier to obtain such baseband information. An antenna 672 may be adapted to transmit a modulated RF carrier over a wireless communications link and receive a modulated RF carrier over a wireless communications link.

A baseband processor 660 may be adapted to provide baseband information from a central processing unit (CPU) 620 to transceiver 670 for transmission over a wireless communications link. Here, CPU 620 may obtain such baseband information from an input device within a user interface 610. Baseband processor 660 may also be adapted to provide baseband information from transceiver 670 to CPU 620 for transmission through an output device within user interface 610.

User interface 610 may comprise a plurality of devices for inputting or outputting user information such as voice or data. Such devices may include, by way of non-limiting examples, a keyboard, a display screen, a microphone, and a speaker.

A receiver 680 may be adapted to receive and demodulate transmissions from an SPS, and provide demodulated information to correlator 640. Correlator 640 may be adapted to derive correlation functions from the information provided by receiver 680. Correlator 640 may also be adapted to derive pilot-related correlation functions from information relating to pilot signals provided by transceiver 670. This information may be used by a mobile station to acquire wireless communications services. Channel decoder 650 may be adapted to decode channel symbols received from baseband processor 660 into underlying source bits. In one example where channel symbols comprise convolutionally encoded symbols, such a channel decoder may comprise a Viterbi decoder. In a second example, where channel symbols comprise serial or parallel concatenations of convolutional codes, channel decoder 650 may comprise a turbo decoder.

A memory 630 may be adapted to store machine-readable instructions which are executable to perform one or more of processes, implementations, or examples thereof which are described or suggested herein. CPU 620 may be adapted to access and execute such machine-readable instructions.

It will, of course, also be understood that, although particular embodiments have just been described, claimed subject matter is not limited in scope to a particular embodiment or implementation. For example, one embodiment may be in hardware, such as implemented on a device or combination of devices, as previously described, for example. Likewise, although claimed subject matter is not limited in scope in this respect, one embodiment may comprise one or more articles, such as a storage medium or storage media, as described above, for example, that may have stored thereon instructions that if executed by a specific or special purpose system or apparatus, for example, may result in an embodiment of a method in accordance with claimed subject matter being executed, such as one of the embodiments previously described, for example. As one potential example, a specific or special purpose computing platform may include one or more processing units or processors, one or more input/output devices, or one or more memories, such as static random access memory, dynamic random access memory, flash memory, or a hard drive, although, again, the claimed subject matter is not limited in scope to this example. Input/output device refers to, for example, one or more devices or features that may accept or otherwise employ human or machine input information or one or more devices or features that may deliver or otherwise provide human or machine output information. By way of example, but not limitation, an input/output device may include a speaker, keyboard, mouse, trackball, data port, touch screen, display etc. A display may comprise a liquid crystal display (LCD), a touch screen display, just to name a few examples.

In the preceding description, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes or equivalents may now occur to those skilled in the art. It is, therefore, to be understood that the appended claims are intended to cover all such modifications or changes as fall within the true spirit of claimed subject matter.

The invention claimed is:

1. An apparatus comprising a digital camera configured to shoot at least two images at different effective lens focal lengths, said camera further being configured to:
   high-pass filter corresponding copies of each of said at least two images;
   estimate respective spectral densities (SD) of said at least two high-pass filtered images; and
   low-pass filter the respective SD estimates of said at least two high-pass filtered images, and
   combine said at least two images into a single image, based on information from said low-pass filtered respective SD estimates, to produce one or more optical effects.

2. The apparatus of claim 1, wherein said camera is configured to combine said at least two images into said single image based on a comparison of pixel values at corresponding pixel locations within said low-pass filtered respective SD estimates.

3. The apparatus of claim 1, wherein, for at least one of the said two images, said effective lens focal length comprises a practical approximation to an infinite focal length.

4. The apparatus of claim 1, wherein said camera is configured to combine said at least two images into said single image to produce an extended depth of field effect.

5. The apparatus of claim 1, wherein said at least two images comprise more than two images.

6. The apparatus of claim 2, wherein said camera is configured to apply a close mask to a result of said comparison and to combine said at least two images into said single image based on a result of said application.

7. The apparatus of claim 6, wherein said camera is further configured to downsample said at least two images to produce said corresponding copies.

8. The apparatus of claim 1, wherein said camera is further configured to generate a combining mask based on said information from said low-pass filtered respective SD estimates, and wherein said camera is configured to combine said at least two images into said single image according to corresponding values of said combining mask.

9. The apparatus of claim 8, wherein said camera is further configured to perform a pixel by pixel comparison to identify for a given pixel location a higher frequency pixel from the respective images of said at least two images to produce said combining mask.

10. The apparatus of claim 9, wherein the pixels of a first image are represented as a first value within the mask and the pixels of a second image are represented as a second value within the mask.

11. The apparatus of claim 10, wherein said camera is configured to upsample said combining mask and to combine said at least two images into said single image based on said upsampled combining mask.

12. The apparatus of claim 1, wherein said digital camera comprises at least one of: a digital video camera or a digital still camera.

13. The apparatus of claim 1, wherein said camera is further configured to identify one or more pixels common to different images for use as reference pixels and to combine said at least two images into said single image based on a result of said identification.

14. The apparatus of claim 13, wherein said reference pixels are utilized for frame registration.

15. An apparatus for capturing digital signal values for one or more digital images comprising:
an image capture device configured to capture multiple images of a scene of interest being produced with varying focal lengths and said image capture device further being configured to high-pass filter corresponding copies of each of said multiple images, produce spectral density estimates of said multiple high-pass filtered images, low-pass filter said spectral density estimates, and combine said multiple images into a single image, based on information from said low-pass filtered spectral density estimates.

16. The apparatus of claim 15, wherein said image capture device is configured to determine one or more varying focal lengths of said multiple images at least in part by a relative distance of various objects within said scene of interest.

17. The apparatus of claim 15, wherein, said image capture device is configured to select varying focal lengths for said multiple images, based at least in part on major objects within said scene of interest.

18. The apparatus of claim 15, wherein said image capture device is configured to select objects within said scene of interest to set one or more focal lengths for said multiple images.

19. The apparatus of claim 15, wherein said image capture device is configured to determine a primary focal length at least in part by a primary object in said scene of interest.

20. The apparatus of claim 15, wherein the image capture device is further configured to employ selected focal objects to determine at least in part one or more focal lengths for said multiple images.

21. A method comprising:
shooting at least two images at different effective lens focal lengths;
high pass filtering (HP) corresponding copies of each of said at least two images;
estimating respective spectral densities (SD) of said at least two high-pass filtered images; and
low pass filtering (LP) the respective SD estimates of said at least two high-pass filtered images prior to combining said at least two images into a single image to produce one or more optical effects.

22. The method of claim 21, wherein said combining comprises combining said at least two images based on a comparison of pixel values at corresponding pixel locations within said low-pass filtered respective SD estimates.

23. The method of claim 21, wherein said combining comprises combining said at least two images into said single image to produce an extended depth of field effect.

24. The method of claim 22, and further comprising applying a close mask after the comparison and prior to said combining.

25. The method of claim 24, and further comprising downsampling said at least two images to produce said corresponding copies.

26. The method of claim 21, and further comprising generating a combining mask based on information from said low-pass filtered respective SD estimates, and
wherein said method includes performing said combining according to corresponding values of said combining mask.

27. The method of claim 26, wherein said evaluating comprises a pixel by pixel comparison to identify for a given pixel location a higher frequency pixel from the respective images of said at least two images to produce said combining mask.

28. The method of claim 26, wherein said combining mask is upsampled prior to said combining.

29. An apparatus comprising:
means for shooting at least two images at different effective lens focal lengths;
means for high pass filtering (HP) corresponding copies of each of said at least two images;
means for estimating respective spectral densities (SD) of said at least two high-pass filtered images;
means for low pass filtering (LP) the respective SD estimates of said at least two high-pass filtered images; and
means for combining said at least two images into a single image, based on information from said low-pass filtered respective SD estimates, to produce one or more optical effects.

30. The apparatus of claim 29, wherein said means for combining is configured to combine said at least two images based on a comparison of pixel values at corresponding pixel locations within said low-pass filtered respective SD estimates.

31. The apparatus of claim 29, wherein said means for combining is configured to combine said at least two images into said single image to produce an extended depth of field effect.

32. The apparatus of claim 30, further comprising means for applying a close mask after the comparison and prior to said combining.

33. The apparatus of claim 32, and further comprising means for down-sampling said at least two images to produce said corresponding copies.

34. The apparatus of claim 29, further comprising means for generating a combining mask based on said information from said low-pass filtered respective SD estimates, wherein said means for combining is configured to combine said at least two images into said single image according to corresponding values of said combining mask.

35. The apparatus of claim 34, wherein said means for generating comprises means for a pixel by pixel comparison to identify for a given pixel location a higher frequency pixel from the respective images of said at least two images to produce said combining mask.

36. The apparatus of claim 35, further comprising means for up sampling prior to said combining.

37. A non-transitory processor-readable medium having stored thereon instructions capable of being executed by a special purpose computing platform to:
- shoot at least two images at different effective lens focal lengths;
- high pass filter (HP) corresponding copies of each of said at least two images;
- estimate respective spectral densities (SD) of said at least two high-pass filtered images; and
- low pass filter (LP) the respective SD estimates of said at least two high-pass filtered images, and
- combine said at least two images into a single image, based on information from said low-pass filtered respective SD estimates, to produce one or more optical effects.

38. The non-transitory processor-readable medium of claim 37, wherein said instructions are further executable to combine said at least two images based on a comparison of pixel values at corresponding pixel locations within said low-pass filtered respective SD estimates.

39. The non-transitory processor-readable medium of claim 37, wherein said instructions are further executable to combine said at least two images into said single image to produce an extended depth of field effect.

40. The non-transitory processor-readable medium of claim 38, wherein said instructions are further executable to apply a close mask after the comparison and prior to the image combination.

41. The non-transitory processor-readable medium of claim 40, wherein said instructions are further executable to down-sample said at least two images to produce said corresponding copies.

42. The non-transitory processor-readable medium of claim 37, wherein said instructions are further executable to generate a combining mask based on said information from said low-pass filtered respective SD estimates, and to combine said at least two images into said single image according to corresponding values of said combining mask.

43. The non-transitory processor-readable medium of claim 42, wherein said instructions are further executable to upsample the combining mask prior to the image combination.

44. The apparatus of claim 1, wherein said camera is configured to shoot said at least two images through a lens, and
wherein a sum of a length of the high-pass filter and a length of the low-pass filter is greater than an effective filter length of a blur caused by the lens.

45. The apparatus of claim 1, wherein said low-pass filtered respective SD estimates are spatially averaged SD estimates.

46. The apparatus of claim 8, wherein said combining mask indicates, for a given pixel location, which among said at least two images has more high-frequency content at the location.

47. The apparatus of claim 8, wherein values of said combining mask indicate relative weightings of corresponding pixel values of said at least two images, and wherein said camera is configured to combine said at least two images into said single image according to said relative weightings.

48. The apparatus of claim 8, wherein said camera is configured to upsample said combining mask and to combine said at least two images into said single image based on said upsampled combining mask.

* * * * *